Feb. 11, 1969    E. H. JONES    3,426,688

DISPENSING APPARATUS

Filed Nov. 1, 1966                                   Sheet 1 of 2

INVENTOR:
ERIC H. JONES
BY
Breitenfeld & Levine
ATTORNEYS

United States Patent Office 3,426,688
Patented Feb. 11, 1969

3,426,688
DISPENSING APPARATUS
Eric Harding Jones, 30 Moss Lane,
Bramhall, England
Filed Nov. 1, 1966, Ser. No. 591,251
Claims priority, application Great Britain, Nov. 6, 1965, 47,153/65
U.S. Cl. 103—85
Int. Cl. F04d 11/00; B67d 5/64; G01f 11/22
12 Claims

ABSTRACT OF THE DISCLOSURE

Apparatus for dispensing liquid or finely divided solid comprising a rotary wheel carrying material holding units which plunge into a reservoir of the liquid or solid during the lower portions of their path of movement and deliver the liquid or solid to a trough during the upper portions of their path of movement the arrangement being such that the volume delivered is proportional to angular movement.

---

This invention concerns apparatus for dispensing a liquid or finely divided solid material at a controlled, for example uniform, rate.

According to the present invention apparatus for dispensing a liquid or finely divided solid material at a controlled rate comprises a reservoir adapted to contain said material, a plurality of material holding units adapted to be moved in a closed loop circuit in a controlled manner whereby for each complete circuit each said unit is drawn through the material and charged with same during the lower portions of its path of movement and positioned during the upper portions of its path of movement to allow at least some of the material contained therein to flow therefrom, and a trough adapted to collect at least some of the material which flows from each said unit, the geometry of each unit and said trough being such that the flow of material to the trough accords with a predetermined pattern.

The invention will be further apparent from the following description with reference to the several figures of the accompanying drawings which show, by way of example only, one form of dispensing apparatus embodying the invention.

Figure 3:
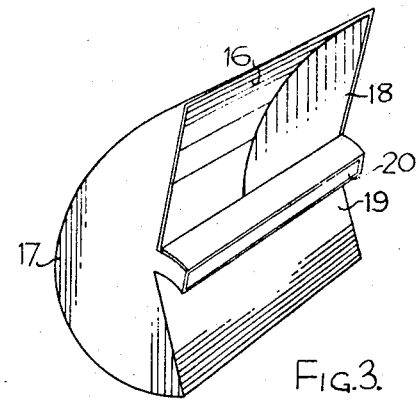
FIG. 3 shows a perspective view of one of the scoop-units of the apparatus.
Figure 1:
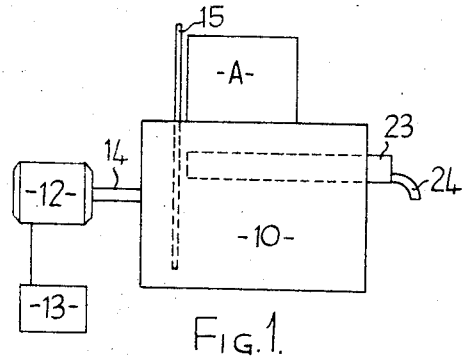
FIG. 1 shows a side view of the apparatus.

The apparatus to be described is intended for the continuous dispensing of a liquid such as water at a desired uniform rate.

Referring now to the drawings, it will be seen that the apparatus essentially comprises a reservoir 10 adapted to contain the liquid which is to be dispensed. A feed pipe 11 (see FIG. 2) is provided for replenishing the contents of the reservoir such that the level of liquid therein is maintained at a suitable height, which however is not critical for operation of the apparatus. The reservoir 10 has an open top, and is of generally semicircular cross-section.

A motor 12 whose operation may be adjusted by means of a control unit 13 is provided and adapted to rotate a horizontal shaft 14 which passes through a bush in the rear wall of the reservoir 10. The control unit 13 may be adapted to cause the motor to rotate either continuously or intermittently at a constant or desired variable rate. A disc 15 is secured to the end of the shaft 14 within the reservoir 10 and lies in closely spaced relationship from the rear wall of the reservoir.

Four units, A, B, C and D, are secured to the disc 14 in equi-angularly spaced relationship. As best seen from FIG. 3, each unit comprises a curved back wall 16, side walls 17 and 18, and a front wall 19 whose edge intermediate the ends of the unit defines a weir. As best seen from FIG. 2, the front wall 19 and parts of the other walls of each unit from a liquid holding portion of quarter-circular cross-section, the remaining parts of the walls 16, 17 and 18 forming a scoop portion adapted to charge the liquid holding portion in a manner to be described hereinafter. An elongated spout 20 extending over the depth of the unit is provided at the junction of the above described portions of each unit, as is clearly apparent from FIGS. 2 and 3.

Figure 2:
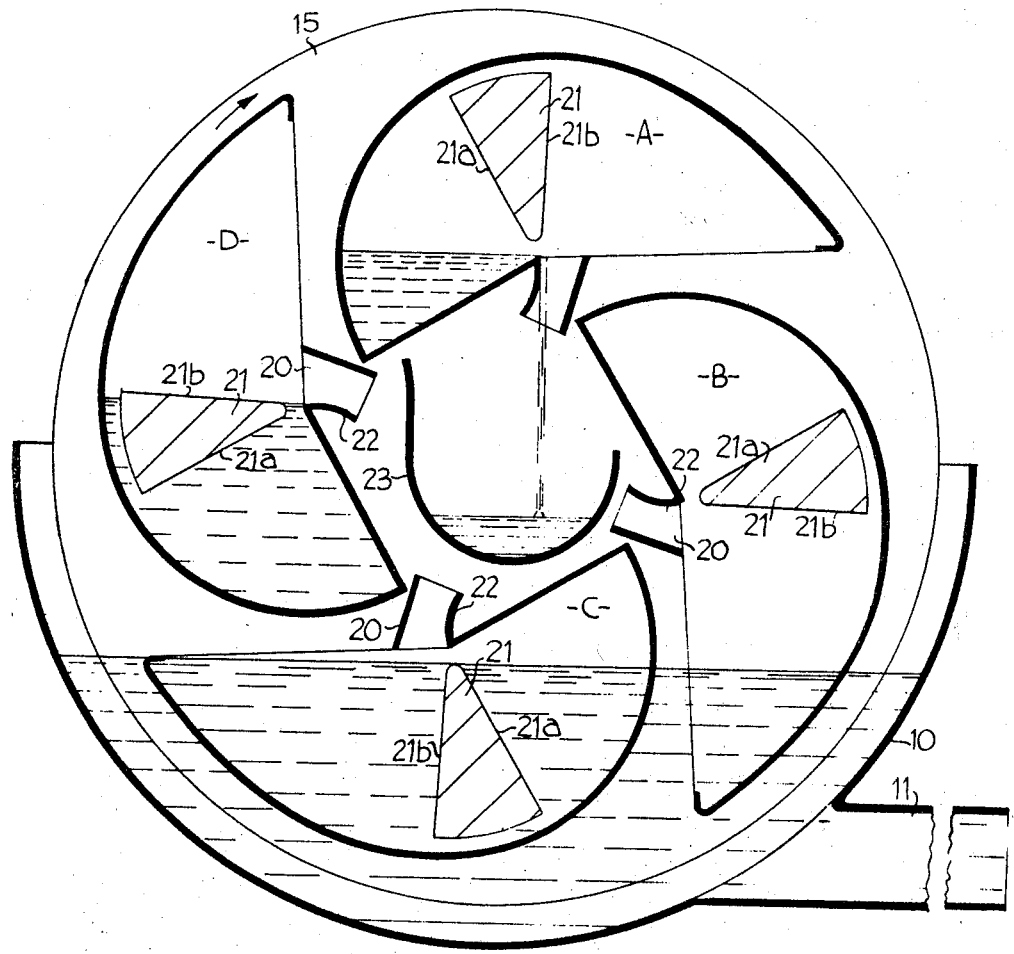
FIG. 2 shows a partly-sectioned front view of the apparatus.

The four units, A, B, C and D, are secured to the disc 15, such that they are forwardly spaced therefrom with their front walls 19 directed towards the ends of the shaft 14 and set at right angles to one another and in such a manner that their scoop portions form leading ends with respect to the direction of rotation of the disc 15 (indicated by the arrow on FIG. 2).

A wedge-shaped member 21 is provided within each of the units so as to extend across same and is disposed such that one of its plane surfaces 21a is at right angles to the front wall 19 and on level with the trailing edge of the spout 20, the other of its plane surfaces 21b being disposed within the scoop portion of the unit. The arcuate end and apex of the member 21 are spaced from the walls 16 and 19 respectively to form passageways through which liquid may flow.

In use the disc 15 is rotated, and for each complete revolution of the disc, each unit describes a full circle. At the lower part of the circular movement of each unit, the unit is drawn through the liquid in the reservoir 10 and the scoop portion of the unit serves to charge the unit with liquid so that as the unit leaves the liquid in the reservoir at least the liquid holding portion thereof is filled. The scoop portions of units are sufficiently large to ensure that this takes place even when the level of liquid in the reservoir is at its permitted minimum. As the unit moves upwardly excess liquid lying above the leading plane surface 21b of the wedge-shaped member 21 flows through the spout 20 and returns to the reservoir 10. At the exact moment that the surface 21a of the wedge-shaped member 21 becomes horizontal, the trailing outer edge 22 of the spout 20 becomes aligned with the left hand wall of the trough 23 (see FIG. 2). As the unit moves through the next 90° of arc, virtually the whole of the contents of the liquid holding portion thereof are delivered under the influence of gravity into the trough 23 which is provided with a delivery spout 24 at its forward end. At the exact moment that the unit completes the 90° movement referred to above, the spout 20 of the following unit 20 comes into alignment with the trough 23, and this latter unit then commences delivery to the trough. The right-hand wall of the trough 23 is positioned so as to allow effectively the whole of the liquid to flow from the unit into the trough.

It will therefore be appreciated that the volume of liquid delivered to the trough in any interval of time is directly proportional to the angular movement of the disc 15 during that interval of time. Thus, if the disc 15 is driven continuously at a uniform rate, liquid is dispensed from the spout 24 also continuously and at a uniform rate, dependent upon the speed of rotation of the disc 15. Of course, the shaft 14 may be driven in a non-uniform manner or an intermittent manner and the delivery of liquid will then proceed in a non-uniform manner or intermittent manner which follows the movement of the shaft.

The purpose of the wedge-shaped members 21 is to define accurately the liquid holding portions of the units from which liquid is to be dispensed, so that at the moment delivery to the trough commences from each unit the volume of liquid available for delivery is substantially equal to the volume of the liquid holding portion and not substantially greater as would be the case if the members 21 were not provided due to the liquid surface being other than horizontal on account of viscous drag particularly applicable at high running speeds.

It will be appreciated that it is not intended to limit the invention to the above example only, many variations, such as might readily occur to one skilled in the art, being possible without departing from the scope thereof.

Thus, different numbers of scoop units may be provided on the rotating disc, though in all cases each scoop unit would be arranged to deliver liquid for 360/n degrees of its movement where n is equal to the number of scoop units provided. Thus, three units could be provided or five or more units could be provided and in the latter cases it would not be necessary to provide a spout for the outflow of liquid a simple weir being sufficient to ensure that the liquid required to be discharged to the trough is so discharged.

Figure 4:
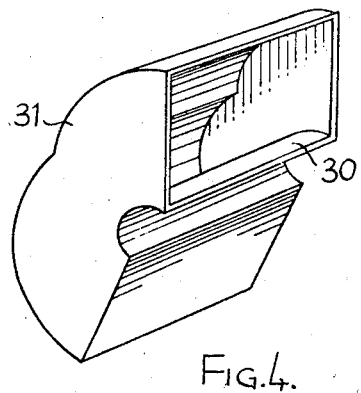
FIG. 4 shows a perspective view of an alternative form of scoop unit.

Again, for example, if very viscous liquids are to be dispensed six units (such as that shown in FIG. 4) may be provided on the disc, each being provided with a part-cylindrical weir 30 over which the liquid would be discharged therefrom, and a suitably profiled rear wall 31. The trough would be arranged to collect liquid flowing from each unit whilst such moved through an angle of 60°, each such unit not being completely emptied at the end of the 60° movement aforesaid. In this way liquid would still be delivered to the trough continuously and any errors which would arise due to the surface of liquid flowing from the unit being other than flat are removed. Such an arrangement would work satisfactorily regardless of the precise position on the preiphery of the cylindrical weir from which the liquid fell under the influence of gravity. The rear wall 31 is profiled so that the shape of the liquid surface flowing from the unit remains substantially constant at least while liquid is being discharged into the trough.

It is envisaged that certain kinds of finely divided solids could be dispensed by apparatus embodying the invention, though such may need to be continuously disturbed by applying vibration to all the parts with which such solids would contact.

In addition to dispensing liquids in a controlled manner, apparatus embodying the invention may be used as a meter for measuring a liquid flow. For this purpose the liquid flow or known proportion thereof would enter the reservoir and the rate of rotation of the units would be adjusted to dispense the liquid so as to maintain a constant head of liquid in the reservoir. The shaft of the apparatus would conveniently drive a tachometer calibrated to give a direct reading of liquid flow.

For dispensing two or more liquids simultaneously in desired proportions two or more dispensing apparatus adjusted to different rotational speeds could be provided, or a compound apparatus having a plurality of reservoirs each provided with different sized units rotatable therein from a common shaft could be provided.

What is claimed is:

1. Apparatus for dispensing a flowable material at a controlled rate, comprising a reservoir adapted to contain the material, a plurality of material-holding units, means for moving said units in a closed loop circuit a part of which is located in said reservoir, each of said units having a material-holding portion and a scoop portion communicating therewith, said scoop portion serving to charge its respective material-holding portion as each unit moves through said reservoir, and a trough surrounded by said circuit, said material-holding portion having an edge over which the material flows into said trough during a portion of the movement of each unit through said circuit, and said material-holding portion being so shaped that the surface area of the material within each unit remains constant throughout the time material flows from the unit to said trough so that the volume of material which flows from each unit during each incremental angular movement of the unit while the latter delivers material to said trough is equal to the volume which flows from each unit during every other such incremental angular movement.

2. Apparatus according to claim 1 including means for moving said units along a circular path.

3. Apparatus according to claim 1 wherein said trough is disposed generally along the axis of rotation of said units and has such a cross-section that as one rotating unit ceases to deliver material thereto the following rotating unit simultaneously commences delivery of material thereto.

4. Apparatus according to claim 3 including a weir at the junction of the scoop and material-holding portions of each unit, and wherein the part of the material holding portion of each said unit which delivers to the trough is defined by a portion which has a cross-section transverse to the axis of rotation which is of sector shape, the apex thereof being coincident with said weir.

5. Apparatus according to claim 4 wherein each unit is arranged such that the material holding portion thereof is empty at the cessation of delivery of material to the trough.

6. Apparatus according to claim 4 wherein a spout is provided on each said unit, which spout comprises an axially extending inwardly directed opening through which the material is delivered to said trough, one edge of the entrance to said spout being coincident with said weir.

7. Apparatus according to claim 4 wherein a wedge-shaped member is provided in each said unit, such member extending axially across the unit from one side thereof to the other with its apex adjacent said weir, one wedge surface thereof lying in the plane dividing the material holding portion from the scoop portion and the other wedge surface being angularly outwardly spaced from the material holding portion, there being a passage for said material between said wedge at the walls of the unit at the outer and inner ends of the wedge member.

8. Apparatus according to claim 5 wherein a wedge-shaped member is provided in each said unit, such member extending axially across the unit from one side thereof to the other with its apex adjacent said weir, one wedge surface thereof lying in the plane dividing the material holding portion from the scoop portion and the other wedge surface being angularly outwardly spaced from the material holding portion, there being a passage for said material between said wedge at the walls of the unit at the outer and inner ends of the wedge member.

9. Apparatus according to claim 6 wherein a wedge-shaped member is provided in each said unit, such member extending axially across the unit from one side thereof to the other with its apex adjacent said weir, one wedge surface thereof lying in the plane dividing the material holding portion from the scoop portion and the other wedge surface being angularly outwardly spaced from the material holding portion, there being a passage for said material between said wedge at the walls of the unit at the outer and inner ends of the wedge member.

10. Apparatus according to claim 3 wherein a wedge-shaped member is provided in each said unit such member extending axially across the unit from one side thereof to the other with its apex adjacent said weir, one wedge surface thereof lying in the plane dividing the material holding portion from the scoop portion and the other wedge surface being angularly outwardly spaced from the material holding portion, there being a passage for said material between said wedge at the walls of the unit at the outer and inner ends of the wedge member.

11. Apparatus according to claim 3 for use in dispensing a liquid of high viscosity including a weir at the junction of the scoop and material holding portions of each unit, said weir being of cylindrical section, the cross-section of the material holding portion of each said unit being profiled such that when each unit is delivering the liquid to the trough, the contour of the liquid surface in the unit remains substantially constant.

12. Apparatus according to claim 9 wherein said means adapted to move said units in a circular path comprises a support to which the units are secured and means for rotating said support at a controlled variable or constant rate either continuously or intermittently.

References Cited

UNITED STATES PATENTS

| | | | |
|---|---|---|---|
| 640,141 | 12/1899 | Lombas | 222—367 X |
| 2,319,830 | 5/1943 | Sampsel | 222—369 X |
| 2,729,365 | 1/1956 | Fettkether et al. | 222—369 X |
| 3,244,327 | 4/1966 | Dunning | 222—369 X |

ROBERT B. REEVES, Primary Examiner.

NORMAN L. STACK, Assistant Examiner.

U.S. Cl. X.R.

222—170, 367